(12) United States Patent
Miller et al.

(10) Patent No.: US 8,225,288 B2
(45) Date of Patent: Jul. 17, 2012

(54) MODEL-BASED TESTING USING BRANCHES, DECISIONS, AND OPTIONS

(75) Inventors: Michael D. Miller, Rancho Santa Fe, CA (US); Ryan R. Ulaszek, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1073 days.

(21) Appl. No.: 12/021,383

(22) Filed: Jan. 29, 2008

(65) Prior Publication Data

US 2009/0193391 A1 Jul. 30, 2009

(51) Int. Cl.
*G06F 9/44* (2006.01)

(52) U.S. Cl. ........ 717/124; 717/106; 717/109; 717/139; 717/143; 717/144; 707/756; 707/805; 706/11

(58) Field of Classification Search .................. None
See application file for complete search history.

(56) References Cited

U.S. PATENT DOCUMENTS

| | | | | |
|---|---|---|---|---|
| 5,412,756 A | * | 5/1995 | Bauman et al. .................. | 706/45 |
| 6,102,965 A | * | 8/2000 | Dye et al. ........................ | 717/109 |
| 6,275,976 B1 | * | 8/2001 | Scandura ....................... | 717/120 |
| 6,996,805 B2 | * | 2/2006 | Achlioptas et al. ............. | 717/124 |
| 7,089,530 B1 | * | 8/2006 | Dardinski et al. .............. | 717/105 |
| 7,216,334 B2 | * | 5/2007 | Kodosky et al. ................ | 717/109 |
| 7,272,815 B1 | * | 9/2007 | Eldridge et al. ................ | 717/101 |
| 7,664,729 B2 | * | 2/2010 | Klein et al. .................... | 707/791 |
| 7,685,083 B2 | * | 3/2010 | Fairweather ..................... | 706/45 |
| 7,685,576 B2 | * | 3/2010 | Hartmann et al. .............. | 717/132 |
| 7,813,911 B2 | * | 10/2010 | Triou et al. ..................... | 703/22 |
| 7,941,438 B2 | * | 5/2011 | Molina-Moreno et al. ... | 707/756 |
| 7,979,849 B2 | * | 7/2011 | Feldstein et al. .............. | 717/128 |
| 2002/0062476 A1 | * | 5/2002 | Saxe et al. ..................... | 717/126 |
| 2003/0130831 A1 | * | 7/2003 | Adir ................................ | 703/22 |
| 2003/0172369 A1 | * | 9/2003 | Kodosky et al. ............... | 717/113 |
| 2004/0153992 A1 | * | 8/2004 | Molina-Moreno et al. ... | 717/105 |
| 2005/0235264 A1 | * | 10/2005 | Hines ............................ | 717/124 |
| 2005/0256665 A1 | * | 11/2005 | Hartmann et al. ............. | 702/121 |
| 2005/0268287 A1 | * | 12/2005 | Achlioptas et al. ............ | 717/124 |
| 2007/0033576 A1 | * | 2/2007 | Tillmann et al. .............. | 717/124 |
| 2009/0064111 A1 | * | 3/2009 | Kornerup et al. ............. | 717/126 |
| 2010/0223211 A1 | * | 9/2010 | Johnson et al. ................. | 706/11 |
| 2010/0223593 A1 | * | 9/2010 | Eldridge et al. .............. | 717/105 |
| 2011/0067000 A1 | * | 3/2011 | Novacek ........................ | 717/105 |

OTHER PUBLICATIONS

Title: Automatic Constraint Based Test Generation for Behavioral HDL Models, author: Hari et al, source: IEEE, dated: Mar. 21, 2008.*
Title: Automatic generation of software behavioral models author: Lorenzoli D et al, source: IEEE, dated: May 10, 2008.*
Title: Automated testing of security functions using a combined model and interface-driven approach author: Chandramouli et al, source: IEEE, dated: Jan. 5, 2004.*

* cited by examiner

*Primary Examiner* — Chameli Das
(74) *Attorney, Agent, or Firm* — Park, Vaughan, Fleming & Dowler LLP; Chia-Hsin Suen (57) ABSTRACT

Some embodiments of the present invention provide a system that tests a software program. During operation, the system creates a behavioral model of the software program using branches, decisions, and options. Next, the system generates a test case from the behavioral model and executes the test case on the software program. Finally, the system analyzes an output of the executed test case to determine a validity of the software program.

18 Claims, 4 Drawing Sheets

MODEL-BASED TESTING USING BRANCHES, DECISIONS, AND OPTIONS

RELATED APPLICATION

The subject matter of this application is related to the subject matter in a co-pending non-provisional application by the same inventors as the instant application and filed on the same day as the instant application, entitled "REALTIME CREATION OF DATASETS IN MODEL-BASED TESTING," and having Ser. No. 12/021,387.

BACKGROUND

Related Art

The present invention relates to model-based testing using branches, decisions, and options.

"Model-based testing" refers to a test automation approach that allows a tester to create a behavioral model of a software system under test (SUT). The structure of the behavioral model may be based on characteristics of the SUT and expressed using modeling methods such as finite state machines, decision tables, and/or state charts. The behavioral model may then be explored to generate a test vector that, in conjunction with a template script, enables creation of a test suite that exercises the SUT. Model-based testing technologies typically include components that allow a user to create the behavioral model of the SUT, explore the behavioral model, and generate tests from the behavioral model.

Complications may arise from both model generation and exploration in traditional model-based testing technologies. First, the SUT may be described using a behavioral model that is optimized for exploration rather than tester usability. For example, an application may be modeled using a decision table that describes the application in a linear manner. Consequently, each path through the application must be explicitly enumerated in the decision table. The generation of such behavioral models may be repetitious, tedious, or unintuitive to a tester and may cause problems for an organization transitioning from traditional forms of testing to model-based testing.

Second, model exploration may be inefficient or computationally intensive. Specifically, test suites generated from the behavioral model may include tests which traverse the same paths within the SUT. In other words, current test generation mechanisms do not provide the minimum set of tests for complete coverage of executable paths in the application. Moreover, all test cases within a test suite must be instantiated before a particular test case may be identified and executed. Thus, model-based testing may be improved through the use of more efficient and intuitive behavioral models and test generation methods.

SUMMARY

Some embodiments of the present invention provide a system that tests a software program. During operation, the system creates a behavioral model of the software program using branches, decisions, and options. Next, the system generates a test case from the behavioral model and executes the test case on the software program. Finally, the system analyzes an output of the executed test case to determine a validity of the software program.

In some embodiments, the behavioral model is created by:
(i) creating the branches;
(ii) creating a set of decisions for each of the branches;
(iii) creating a set of options for each of the decisions; and
(iv) linking the branches by attaching an option from a branch to another branch.

In some embodiments, the branches correspond to components of the software program.

In some embodiments, the system further receives a new component of the software program and then updates the behavioral model using the new component.

In some embodiments, updating the behavioral model involves:
(i) creating a new branch corresponding to the new component;
(ii) associating the new branch with at least one new decision and at least one new option; and
(iii) linking the new branch to another branch in the behavioral model.

In some embodiments, a portion of the behavioral model corresponding to a component of the software program is reused in another behavioral model of another software program.

In some embodiments, the behavioral model is generated using a graphical user interface (GUI).

In some embodiments, the test case traverses a path of the behavioral model.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention provide a method and system for testing a software program, such as a tax-preparation application, a word-processing application, an operating system, and/or an enterprise application. Specifically, embodiments of the invention provide a method and system for model-based testing of the software program. To test the software program, a behavioral model of the software program may be created by a tester of the software program. The behavioral model may then be used to generate one or more test cases which are executed on the software program and used to determine the validity of the software program.

In one or more embodiments of the invention, the behavioral model is created using branches, decisions, and options. Each branch of the behavioral model may correspond to a component of the software program, thus allowing the model to easily adapt to changes in the software program. The behavioral model may also be generated using a graphical user interface (GUI), which may enable the behavioral model to be created with greater ease and efficiency.

Figure 1:
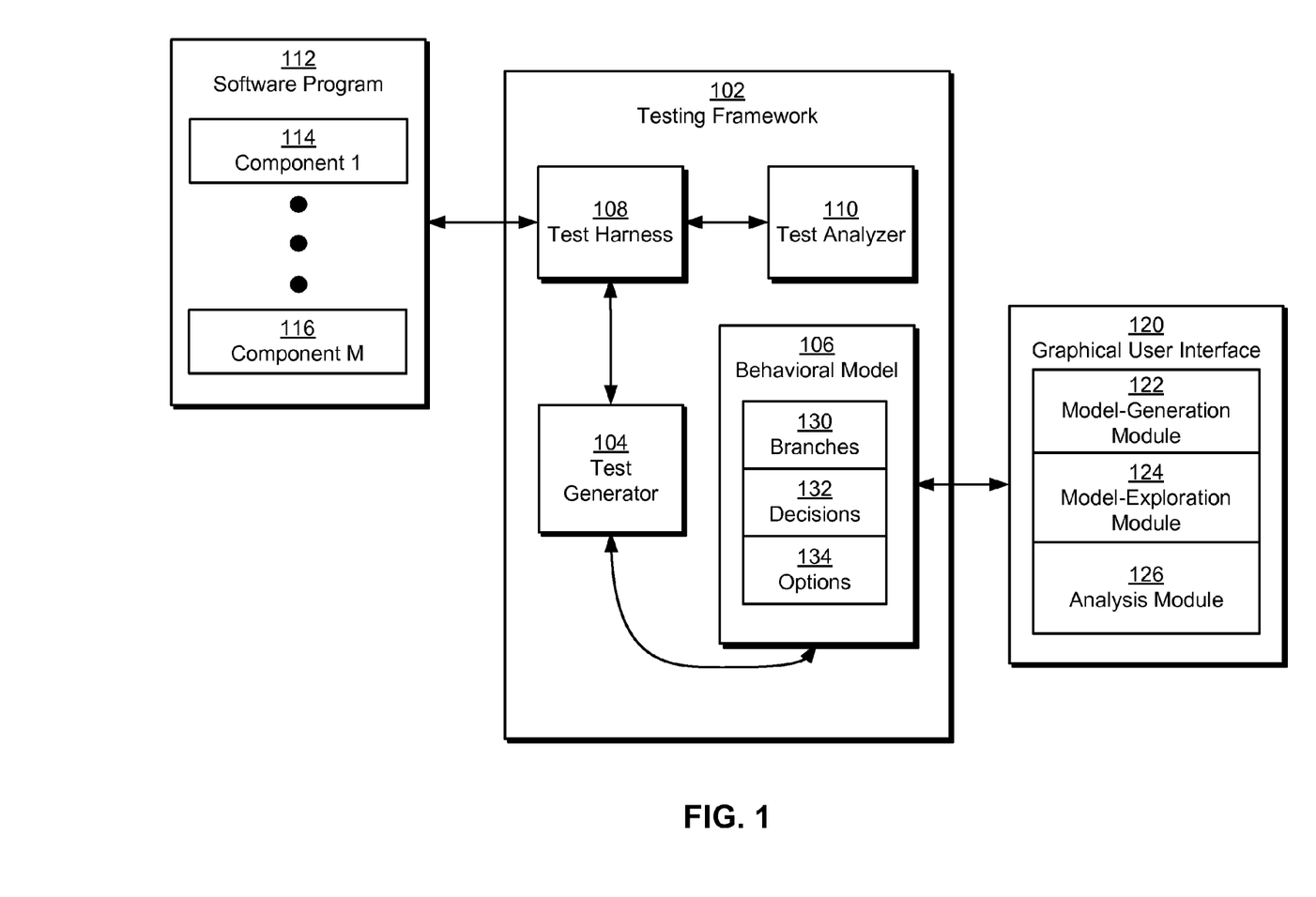
FIG. 1 shows a schematic of a system in accordance with an embodiment of the present invention.

FIG. 1 shows a schematic of a system in accordance with an embodiment of the present invention. As shown in FIG. 1, the system includes a testing framework 102 and graphical user interface 120 for testing a software program 112. Testing framework 102 further includes a behavioral model 106, a test generator 104, a test harness 108, and a test analyzer 110. Each of these components is described in detail below.

Software program 112 may correspond to a standalone application, operating system, enterprise application, database, and/or other type of software. In addition, software program 112 may be executed in a variety of environments. For example, software program 112 may be executed on a single desktop computer or workstation, or software program 112 may be distributed across multiple servers within a data center.

As shown in FIG. 1, software program 112 includes multiple components (e.g., component 1 114, component m 116). Each component may correspond to a module or sub-module within software program 112. For example, an enterprise solution may include one or more components corresponding to databases, business logic layers, user interfaces, network configurations, middleware, and/or other parts of the enterprise solution. In other words, components may refer to individual software modules (e.g., functions, objects, packages, libraries, etc.) that perform specific tasks or store specific information within software program 112. In addition, the functionality of software program 112 may be produced by the interaction of the components with one another. For example, a financial transaction application may include one or more databases for storing data related to financial accounts, financial transactions, and users; business logic and middleware for performing financial transactions; and a user interface to allow users to access and use the application.

Those skilled in the art will appreciate that multiple stages of development and testing may be required to implement, improve, and maintain the various features of software program 112. To streamline the testing process, testing framework 102 may be used to automate the generation and execution of tests on software program 112, as explained below.

In one or more embodiments of the invention, testing framework 102 corresponds to a model-based testing framework. In other words, testing framework 102 may use behavioral model 106 to describe the expected behavior of software program 112. More specifically, behavioral model 106 may correspond to a representation of the components within software program 112, as well as the expected interaction of the components with one another and with a user of software program 112. For example, behavioral model 106 may describe the various financial transactions available to the user of a financial transaction application, as well as sequences of steps involved in making valid financial transactions using the financial transaction application. As a result, behavioral model 106 may describe the structure of software program 112 as well as possible inputs to and outputs from software program 112.

In one or more embodiments of the invention, behavioral model 106 is created by a human tester of software program 112. In other words, the human tester may be responsible for characterizing the expected behavior of software program 112 using behavioral model 106. In addition, behavioral model 106 may be created before, parallel to, or after the creation of software program 112. Alternatively, behavioral model 106 may be automatically created in part or in whole from the software modules within software program 112. For example, a script may be used to map components and subcomponents from software program 112 to behavioral model 106.

As shown in FIG. 1, behavioral model 106 includes a set of branches 130, a set of decisions 132, and a set of options 134. In one or more embodiments of the invention, behavioral model 106 is structured using a dataset model containing branches 130, decisions 132, and options 134. In addition, the use of branches 130, decisions 132, and options 134 in behavioral model 106 may allow the tester to quickly update, change, and/or reuse parts of behavioral model 106 in response to changes to software program 112, as explained below with respect to FIG. 2.

In one or more embodiments of the invention, testing framework 102 generates test cases for software program 112 using test generator 104. For example, test generator 104 may generate a set of testing scripts from behavioral model 106. The testing scripts may be independently executable files or abstract descriptions (e.g., function calls, object instantiations, etc.) of paths through software program 112. Test generator 104 may also use behavioral model 106 to generate human-readable documents (e.g., text files, portable document format (PDF) files, etc.) that assist human testers with manual testing of software program 112. For example, test generator 104 may create a text file that contains a series of steps to be performed on software program 112. A human tester may then perform the steps described in the text file to test one or more aspects of software program 112.

Once test cases are produced by test generator 104, the test cases may be executed on software program 112 using test harness 108. In one or more embodiments of the invention, test harness 108 enables communication between software program 112 and testing framework 102 and allows test cases to be run on software program 112. For example, test harness 108 may hook abstract test cases to developed code within software program 112 and monitor the behavior and outputs of software program 112 under the executing test cases. Test harness 108 may also provide the monitored behavior and outputs to test analyzer 110, which may analyze the collected data to determine the validity of software program 112. For example, test analyzer 110 may determine a passing or failing of a test case by examining output values collected by test harness 108 from the test case. Test analyzer 110 may then base the validity of software program 112 on the number and type of passed or failed test cases.

In one or more embodiments of the invention, user input is provided to testing framework 102 using graphical user interface (GUI) 120. In other words, a tester may specify preferences regarding behavioral model 106, test generator 104, test harness 108, and test analyzer 110 using GUI 120. In one or more embodiments of the invention, the tester may use a model-generation module 122 within GUI 120 to generate and update behavioral model 106. For example, the tester may use various GUI components corresponding to branches 130, decisions 132, and options 134 to construct behavioral model 106. Consequently, the tester may experience greater ease and efficiency in generating behavioral model 106 by avoiding extensive programming using model-generation module 122.

To generate and execute tests, the tester may use a model-exploration module 124 within GUI 120. For example, model-exploration module 124 may allow the tester to view a graphical representation of behavioral model 106 and select test cases and/or test suites from one or more GUI components within the graphical representation. Model-exploration module 124 may also allow the tester to schedule selected tests. For example, the tester may select test cases and/or test suites from a list displayed within model-exploration module 124 and specify generation and/or execution times for each selected test case and/or test suite.

The tester may use an analysis module 126 within GUI 120 to view test results and analyses from test analyzer 110. The tester may also be able to specify additional actions based on the test results using analysis module 126. For example, the tester may view collected data from the executed test cases, outcomes of the executed test cases, and the analysis of the outcomes from test analyzer 110. The tester may further specify corrective actions in the case of failed tests. For example, the tester may modify the model using model-generation module 122 or report bugs to developers.

Figure 2:
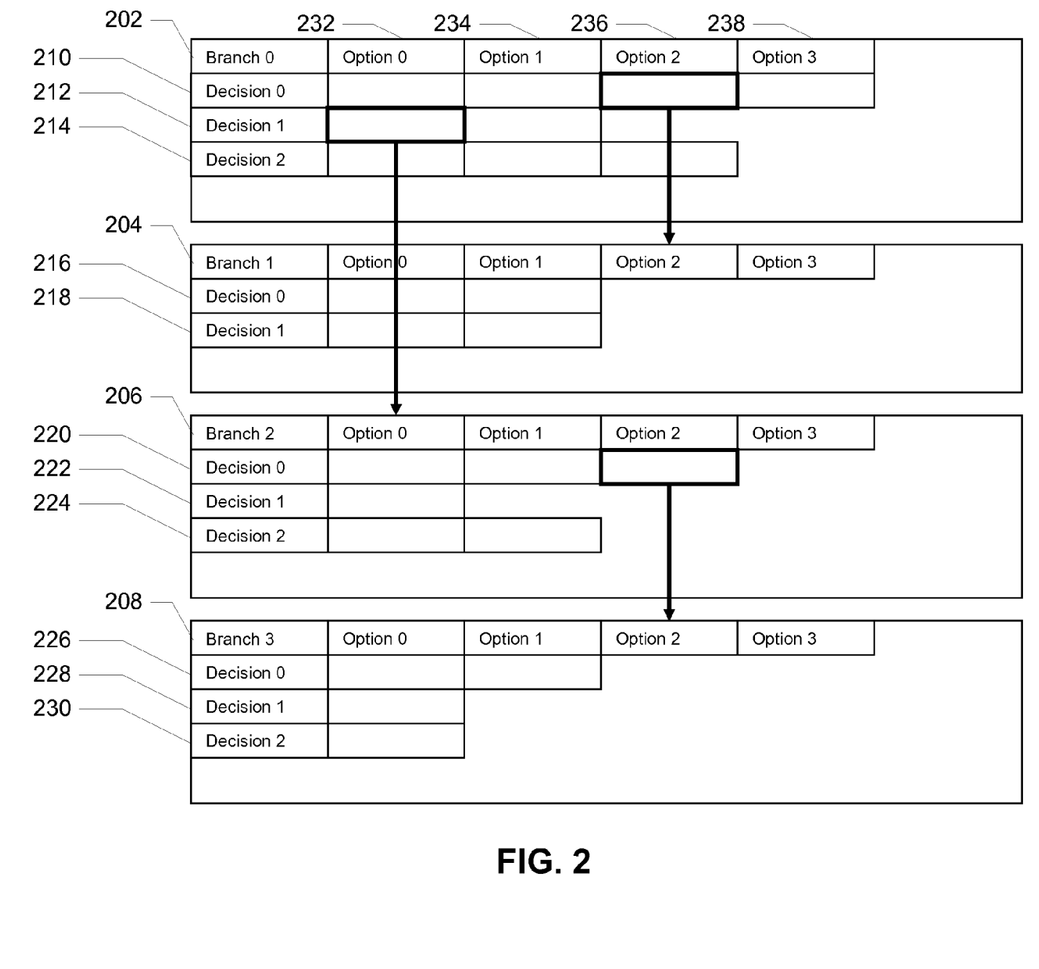
FIG. 2 shows a behavioral model in accordance with an embodiment of the present invention.

FIG. 2 shows a behavioral model in accordance with an embodiment of the present invention. As described above, the behavioral model may be used to describe a software program under test, such as a driver, an operating system, or an application. More specifically, the behavioral model may describe the various paths of the software program. The behavioral model may also be used by a testing framework, such as testing framework 102 of FIG. 1, to automatically generate and/or execute tests on the software program. As shown in FIG. 2, the behavioral model includes a set of branches 202-208, a set of decisions 210-230, and a set of options 232-238 associated with each decision.

As described above, the behavioral model may correspond to a dataset model which is structured using branches 202-208, decisions 210-230, and options 232-238. Each decision 210-230 is associated with a branch, and each option 232-238 is associated with a decision. In addition, branches 202-208 are linked through attachments from options of one branch to another branch. For example, branch 0 202 is linked to branch 1 204 through option 2 236 of decision 0 210, branch 2 206 is linked to branch 3 208 using option 2 236 of decision 0 220, and branch 0 202 is linked to branch 2 206 through option 0 232 of decision 1 212.

Each possible path or state of the software program may be represented by the branches, decisions, options, and links of the behavioral model. More specifically, a path may be constructed by the selection of specific options within each decision of a branch, as well as the attachments between selected options and other branches of the behavioral model. For example, branch 0 202 may represent a starting point of the software program. Decisions 210-214 within branch 0 202 and options 232-238 within decisions 210-214 may represent a portion of the possible paths and/or states the software program may be in. In other words, each state and/or path of the software program may be characterized by a particular combination of options within the dataset model.

Furthermore, the number of available states and/or paths may be increased by attaching the options within a branch to another branch. Selection of an option attached to another branch represents an extension of the path and/or number of states to the other branch. For example, four more possible states and/or paths are added to the behavioral model by attaching option 2 236 of decision 0 210 to branch 1 204. As a result, a sequence of steps that correspond to a path through the software program may be represented by the attachment of options from branches to other branches in a particular order. Referring to FIG. 2, a path that proceeds from branch 0 202 to branch 2 206 and from branch 2 206 to branch 3 208 may be made by the selection of option 0 232 from decision 1 212 and a subsequent selection of option 2 236 of decision 0 220 within branch 2. Consequently, the behavioral model allows a large number of paths and/or states of the software program to be represented using relatively few constructs.

For example, a tax-preparation application may include a variety of software modules for leading a user through the tax-preparation process. The software modules may include mechanisms for obtaining information and preferences from the user, performing calculations based on the information and preferences, saving the user's progress, and filing tax forms on the user's behalf. Due to the variety of options available, the user may traverse the application in a number of ways. In addition, the user may not use certain modules at all while using some modules multiple times. Such variants on the application's use may require explicit enumeration in models such as state diagrams or decision tables, while the variants may be inherently expressed in the branches, decisions, and options in the behavioral model of FIG. 2.

Those skilled in the art will appreciate that options 232-238 may refer to options available to a user of the software program as well as to options with respect to the execution of the software program. For example, options may correspond to user-provided preferences or information to the software program. On the other hand, options may correspond to non-user-provided factors such as the availability of a network connection, a native operating system within which the software program is executing, and/or the amount of memory available to the software program.

As described above, the behavioral model of FIG. 2 may be created using a GUI. Each branch, decision, and option of the behavioral model may be represented using a GUI component, such as a table, box, text box, or cell. The GUI components may be created and manipulated by performing common GUI input actions such as clicking, selecting, copying, pasting, dragging, and dropping. Attachments between options and branches may also be placed using GUI elements such as arrows. As a result, creation of the behavioral model using the GUI may further simplify the modeling of the software program.

In one or more embodiments of the invention, each branch 202-208 corresponds to a component of the software program. In other words, each branch 202-208 may refer to a specific software module (e.g., library, package, object, function, etc.) of the software program. In addition, the branches 202-208 may allow the software program to be modeled on different levels of execution. For example, the behavioral model may be constructed using branches that correspond to functions of a particular type (e.g., business logic, user interface, persistence, etc). The mapping of branches to different components of the software program may also allow the software program to be tested using varying levels of specificity. For example, the software program may be tested for correctness by examining specific values of variables as a path through the software program is traversed, or by monitoring the procession of the software program among various modules of the software program.

Those skilled in the art will appreciate that the behavioral model may be updated to reflect changes in the software program by adding and/or removing branches. For example, a new branch or set of branches may be added to the behavioral model to reflect the addition of one or more new components to the software program. Each new branch includes at least one new decision, which includes at least one new option. The new branches may then be linked to other branches of the behavioral model to describe the software program paths that include the new components. Similarly, a portion of the behavioral model may be reused in another behavioral model for another software program if the two software programs contain similar or identical modules. For example, branches corresponding to tax-preparation libraries may be reused in behavioral models for different tax-preparation applications. Similarly, branches corresponding to commonly used tools such as document viewers and editors may be reused in all applications that contain such tools.

In one or more embodiments of the invention, a test case is generated from the behavioral model by traversing part or all of a path through the behavioral model. In other words, the test case may correspond to a dataset containing a series of steps which are determined by the interrelated branches, decisions, and options of the behavioral model. For example, a short test case may include option 3 238 from decision 0 210, option 1 234 from decision 1 212, and option 1 234 from decision 2 214. However, a longer test case may be created by selecting option 2 236 of decision 0 210, which leads to two additional options from branch 1 204 before proceeding to options from decision 1 212 and decision 2 214. Similarly, inclusion of option 0 232 of decision 1 212 may lead to additional options in branch 2 206 and possibly branch 3 208.

Once the test case is created from the behavioral model, the test case may be executed on the software program. In other words, the series of steps in the test case may be run on the software program. In addition, data regarding the behavior and outputs of the software program may be collected to determine a validity of the software program. For example, a test case may be run on a tax-preparation application to check for proper implementation of tax rules, flow of the application from one module to another, and/or other attributes.

Figure 3:
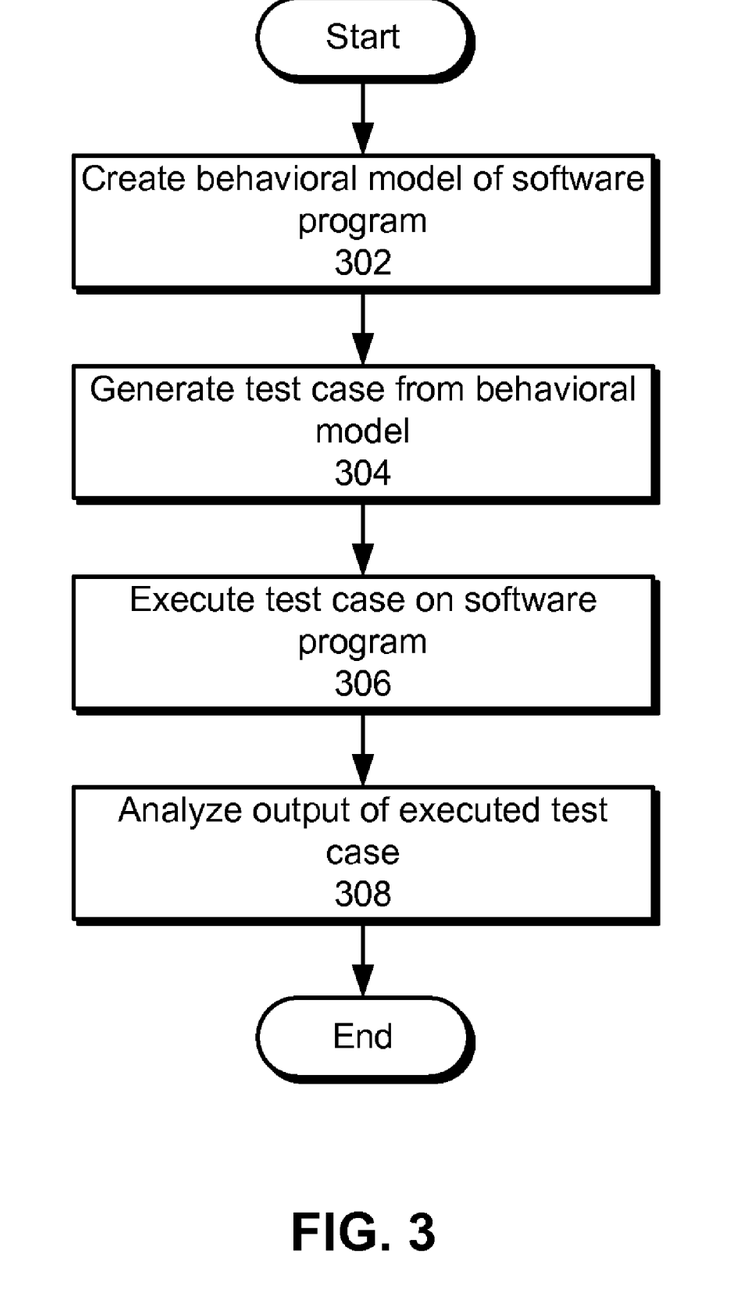
FIG. 3 shows a flowchart of testing a software program in accordance with an embodiment of the present invention.

FIG. 3 shows a flowchart of testing a software program in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a behavioral model of the software program is created (operation 302). The behavioral model may correspond to a dataset model with branches, decisions, and options, as described above. The behavioral model may be generated by a tester of the software program, or the behavioral model may be automatically generated in part or in full from the software program. The behavioral model may also be created in part or in full using a GUI.

A test case is then generated from the behavioral model (operation 304). The test case may correspond to a sequence of steps that traverses a path through the software program. In addition, each step may correspond to an option of the behavioral model. The test case may then be executed on the software program (operation 306). For example, the test case may be executed by running one or more scripts to access the software program, directly performing function calls on the software program, and/or manually performing the steps of the test case on the software program. An output of the executed test case is then analyzed (operation 308) to determine a validity of the software program. The output may correspond to attributes such as specific values, value ranges, use of appropriate modules within the software program, and/or display of information within the software program's user interface. The test case may form a part of a test suite, which may be used to test different aspects of the software program's execution.

Figure 4:
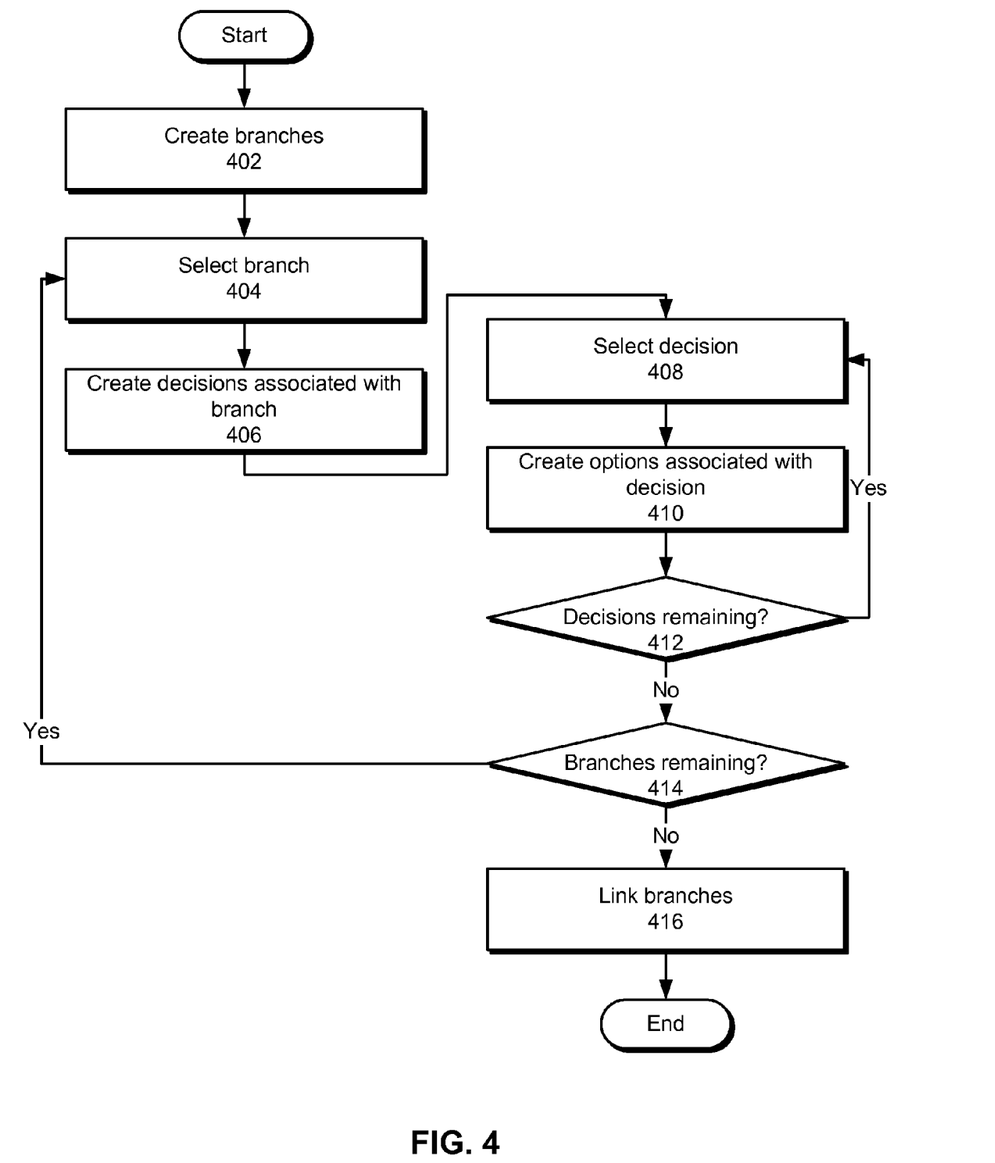
FIG. 4 shows a flowchart of creating a behavioral model in accordance with an embodiment of the present invention.

FIG. 4 shows a flowchart of creating a behavioral model in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, branches of the behavioral model are created (operation 402). As described above, the branches may correspond to components (i.e., modules) of a software program, such as libraries, packages, functions, and/or objects. In addition, the branches may be based on components of a particular size to enable testing of the software program at a particular granularity. In one or more embodiments of the invention, each branch includes a number of decisions, and each decision includes a number of options. To populate the branches with decisions, a branch is selected (operation 404) and decisions associated with that branch are created (operation 406). To populate the decisions with options, a decision is selected (operation 408) and a set of options associated with that decision is created (operation 410). For example, in a tax-preparation application, a decision related to a user's tax filing status may include options such as "single," "married filing jointly," "married filing separately," or "head of household." The decision may also be included in the same branch as other decisions corresponding to basic tax information, such as the user's state of residence, the user's name, and/or the user's social security number.

If the selected branch includes other decisions (operation 412), each decision is selected (operation 408) and options are created for that decision (operation 410) until all decisions within the selected branch are populated with at least one option. Similarly, if the behavioral model includes other branches (operation 414), the remaining branches are iterated through and decisions and options are created for each branch (operations 404-414) until all branches are populated with decisions and all decisions are populated with options.

The branches are then linked (operation 416) by attaching options from branches to other branches. In one or more embodiments of the invention, the branches are linked such that a starting branch has a path to every other branch of the behavioral model. In other words, the behavioral model is created such that each option within the behavioral model is accessible through a sequence of steps from the first or starting branch. As a result, the behavioral model characterizes all paths through the software program through the use of branches, decisions, options, and attachments between options and branches.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:
1. A method for testing a software program, comprising:
creating a behavioral model for the software program using branches, decisions, and options, each decision being associated with a corresponding branch and each option being associated with a corresponding decision, wherein the behavioral model comprises one or more attachments, each attachment linking an option of a branch to another branch;

displaying the behavioral model in a graphical user interface (GUI), wherein in the displayed behavioral model, each branch is represented using a table, each decision is represented using a row of the table, the row comprising a set of boxes, each box representing an option for the corresponding decision, and wherein each attachment between an option of a branch and another branch is represented using an arrow;

constructing one or more paths in the behavioral model, wherein each path comprises options from one or more corresponding decisions of one or more branches and attachments between the options in the path and other branches of the behavioral model;

generating a test case from the behavioral model, wherein the test case traverses a path in the behavioral model;

executing the test case on the software program; and analyzing an output of the executed test case to determine a validity of the software program.

2. The method of claim 1, wherein the behavioral model is created by:
creating the branches;
creating a set of decisions for each of the branches;
creating a set of options for each of the decisions; and
linking the branches by attaching an option from a branch to another branch.

3. The method of claim 2, wherein the branches correspond to components of the software program.

4. The method of claim 3, further comprising:
receiving a new component of the software program; and
updating the behavioral model using the new component.

5. The method of claim 4, wherein updating the behavioral model involves:
creating a new branch corresponding to the new component;
associating the new branch with at least one new decision and at least one new option; and
linking the new branch to another branch in the behavioral model.

6. The method of claim 3, wherein a portion of the behavioral model corresponding to a component of the software program is reused in another behavioral model of another software program.

7. The method of claim 1, wherein the test case traverses a path of the behavioral model.

8. A system for testing a software program, comprising:
a processor;
a graphical user interface (GUI);
a model generator configured to create a behavioral model for the software program using branches, decisions, and options, each decision being associated with a corresponding branch and each option being associated with a corresponding decision, wherein the behavioral model comprises one or more attachments, each attachment linking an option of a branch to another branch;
wherein the graphical user interface is configured to display the behavioral model, wherein in the displayed behavioral model, each branch is represented using a table, each decision is represented using a row of the table, the row comprising a set of boxes, each box representing an option for the corresponding decision, and wherein each attachment between an option of a branch and another branch is represented using an arrow;
wherein the model generator is further configured to construct one or more paths in the behavioral model, wherein each path comprises options from one or more corresponding decisions of one or more branches and attachments between the options in the path and other branches of the behavioral model;
a test generator configured to generate a test case from the behavioral model, wherein the test case traverses at least one path of the behavioral model;
a test harness configured to execute the test case on the software program; and
a test analyzer configured to analyze an output of the executed test case to determine a validity of the software program.

9. The system of claim 8, wherein the behavioral model is created by:
creating the branches;
creating a set of decisions for each of the branches;
creating a set of options for each of the decisions; and
linking the branches by attaching an option from a branch to another branch.

10. The system of claim 9, wherein the branches correspond to components of the software program.

11. The system of claim 10, wherein the behavioral model is updated by:
creating a new branch corresponding to a new component of the software program;
associating the new branch with at least one new decision and at least one new option; and
linking the new branch to another branch in the behavioral model.

12. The system of claim 10, wherein a portion of the behavioral model corresponding to a component of the software program is reused in another behavioral model of another software program.

13. A non-transitory computer-readable storage medium storing instructions that when executed by a computer cause the computer to perform a method for testing a software program, the method comprising:
creating a behavioral model for the software program using branches, decisions, and options, each decision being associated with a corresponding branch and each option being associated with a corresponding decision, wherein the behavioral model comprises one or more attachments, each attachment linking an option of a branch to another branch;
displaying the behavioral model in a graphical user interface (GUI), wherein in the displayed behavioral model, each branch is represented using a table, each decision is represented using a row of the table, the row comprising a set of boxes, each box representing an option for the corresponding decision, and wherein each attachment between an option of a branch and another branch is represented using an arrow;
constructing one or more paths in the behavioral model, wherein each path comprises options from one or more corresponding decisions of one or more branches and attachments between the options in the path and other branches of the behavioral model;
generating a test case from the behavioral model, wherein the test case traverses at least one path of the behavioral model;
executing the test case on the software program; and
analyzing an output of the executed test case to determine a validity of the software program.

14. The non-transitory computer-readable storage medium of claim 13, wherein the behavioral model is created by:
creating the branches;
creating a set of decisions for each of the branches;

creating a set of options for each of the decisions; and linking the branches by attaching an option from a branch to another branch.

15. The non-transitory computer-readable storage medium of claim 14, wherein the branches correspond to components of the software program.

16. The non-transitory computer-readable storage medium of claim 15, the method further comprising:

receiving a new component of the software program; and updating the behavioral model using the new component.

17. The non-transitory computer-readable storage medium of claim 16, wherein updating the behavioral model involves:

creating a new branch corresponding to the new component;

associating the new branch with at least one new decision and at least one new option; and linking the new branch to another branch in the behavioral model.

18. The non-transitory computer-readable storage medium of claim 15, wherein a portion of the behavioral model corresponding to a component of the software program is reused in another behavioral model for another software program.

* * * * *